United States Patent
Thompson et al.

(10) Patent No.: US 9,513,183 B2
(45) Date of Patent: Dec. 6, 2016

(54) PROCESS ISOLATION DIAPHRAGM ASSEMBLY FOR METAL PROCESS SEAL

(71) Applicant: Rosemount Inc., Chanhassen, MN (US)

(72) Inventors: Tyler Matthew Thompson, Chanhassen, MN (US); David Anthony Horky, Mound, MN (US); Thomas Earl Johnson, St. Louis Park, MN (US)

(73) Assignee: Rosemount Inc., Chanhassen, MN (US)

( * ) Notice: Subject to any disclaimer, the term of this patent is extended or adjusted under 35 U.S.C. 154(b) by 201 days.

(21) Appl. No.: 14/319,400

(22) Filed: Jun. 30, 2014

(65) Prior Publication Data

US 2015/0377733 A1 Dec. 31, 2015

(51) Int. Cl.
*G01L 7/00* (2006.01)
*G01L 19/06* (2006.01)
*B23K 11/14* (2006.01)

(52) U.S. Cl.
CPC ............ *G01L 19/0645* (2013.01); *B23K 11/14* (2013.01); *G01L 19/06* (2013.01); *G01L 19/0627* (2013.01)

(58) Field of Classification Search
None
See application file for complete search history.

(56) References Cited

U.S. PATENT DOCUMENTS

| | | | |
|---|---|---|---|
| 5,230,248 A | 7/1993 | Cucci et al. | |
| 5,922,965 A * | 7/1999 | Behm ................. | G01L 13/026 73/706 |
| 6,055,863 A | 5/2000 | Behm et al. | |
| 2005/0204822 A1 * | 9/2005 | Schumacher .......... | G01F 1/383 73/718 |
| 2007/0163355 A1 * | 7/2007 | Nassar .................. | G01L 7/082 73/715 |
| 2008/0229838 A1 | 9/2008 | Kleven et al. | |
| 2009/0308170 A1 * | 12/2009 | Broden ............... | G01L 19/0645 73/723 |
| 2012/0079884 A1 * | 4/2012 | Broden ................ | G01L 13/026 73/717 |
| 2013/0068029 A1 * | 3/2013 | Romo .................. | G01L 13/026 73/706 |

(Continued)

FOREIGN PATENT DOCUMENTS

| WO | WO 9301480 A1 * | 1/1993 | ......... G01L 19/0645 |
| WO | WO 2012141973 A1 * | 10/2012 | ........... G01L 13/026 |

OTHER PUBLICATIONS

International Search Report and Written Opinion for International Application No. PCT/US2015/037998, date of mailing: Sep. 30, 2015, date of filing: Jun. 26, 2015, 14 pages.

*Primary Examiner* — Andre Allen
(74) *Attorney, Agent, or Firm* — Christopher R. Christenson; Kelly, Holt & Christenson PLLC

(57) ABSTRACT

A process fluid pressure transmitter includes a sensor body having a pressure sensor and electronics coupled to the pressure sensor to obtain an indication of pressure from the pressure sensor. At least one process fluid isolation assembly is fluidically coupled to the pressure sensor and is configured to receive a process fluid. The process fluid isolation assembly includes an isolation diaphragm welded to a weld ring. The weld ring has a sealing surface on a first side adapted for contact with a metal sealing ring and a weld portion welded to the sensor body on a second side. The sealing surface and the weld are substantially aligned with one another.

21 Claims, 5 Drawing Sheets

(56) References Cited

U.S. PATENT DOCUMENTS

| | | | |
|---|---|---|---|
| 2014/0090476 A1* | 4/2014 | Miller | G01L 19/0046 73/706 |
| 2015/0000417 A1* | 1/2015 | Hedtke | G01L 9/0042 73/724 |
| 2015/0090039 A1* | 4/2015 | Broden | F16J 15/06 73/706 |

* cited by examiner

PROCESS ISOLATION DIAPHRAGM ASSEMBLY FOR METAL PROCESS SEAL

BACKGROUND

Process devices, such as process fluid pressure transmitters, generally sense pressure using a pressure sensor coupled to at least one isolation diaphragm. The isolation diaphragm isolates the pressure sensor from process fluids that are being sensed. Process fluids, which can be highly corrosive, are thus kept isolated from the pressure sensor to avoid corrosion or damage to the pressure sensor. Pressure is transferred from the isolation diaphragm to the pressure sensor using a substantially incompressible isolation fluid in a passageway that fluidically couples the isolation diaphragm to a sensing diaphragm of the pressure sensor. The sensing diaphragm deflects in response to the applied pressure, and the deflection causes a change in an electrical parameter, such as capacitance, of a structure attached to or associated with the sensing diaphragm The process fluid pressure transmitter is generally coupled to the process using a manifold or other suitable structure. The process fluid pressure transmitter is sealed to the manifold to ensure that process fluid does not leak. In a typical process fluid pressure transmitter, the sealing surface of the process fluid pressure transmitter contacts a non-metallic seal or other suitable structure. Welds for attaching the isolation diaphragm are sometimes located on the same surface that upon which the seal is seated. However, the non-metallic seal is compliant enough to tolerate variations in the surface of the weld and yet still effectively seal to the welded surface Some non-metallic seals can retain pressures over 6000 psi. However, for higher temperature applications where the normal working pressure is over 6000 psi metal seals can provide some advantages. When using metal seals, for high pressure applications, the welds for attaching the isolation diaphragm cannot typically be located on the sealing surface due to specific surface finish requirements of the metal seals.

Providing a process isolation diaphragm assembly that retains all of the advantages of metal seals, with fewer drawbacks, would represent an improvement to process isolation diaphragm assemblies for high pressure process fluid applications.

SUMMARY

A process fluid pressure transmitter includes a sensor body having a pressure sensor and electronics coupled to the pressure sensor to obtain an indication of pressure from the pressure sensor. At least one process fluid isolation assembly is fluidically coupled to the pressure sensor and is configured to receive a process fluid. The process fluid isolation assembly includes an isolation diaphragm welded to a weld ring. The weld ring has a sealing surface on a first side adapted for contact with a metal sealing ring and a weld portion welded to the sensor body on a second side. The sealing surface and the weld are substantially aligned with one another.

DETAILED DESCRIPTION OF ILLUSTRATIVE EMBODIMENTS

Figure 1:
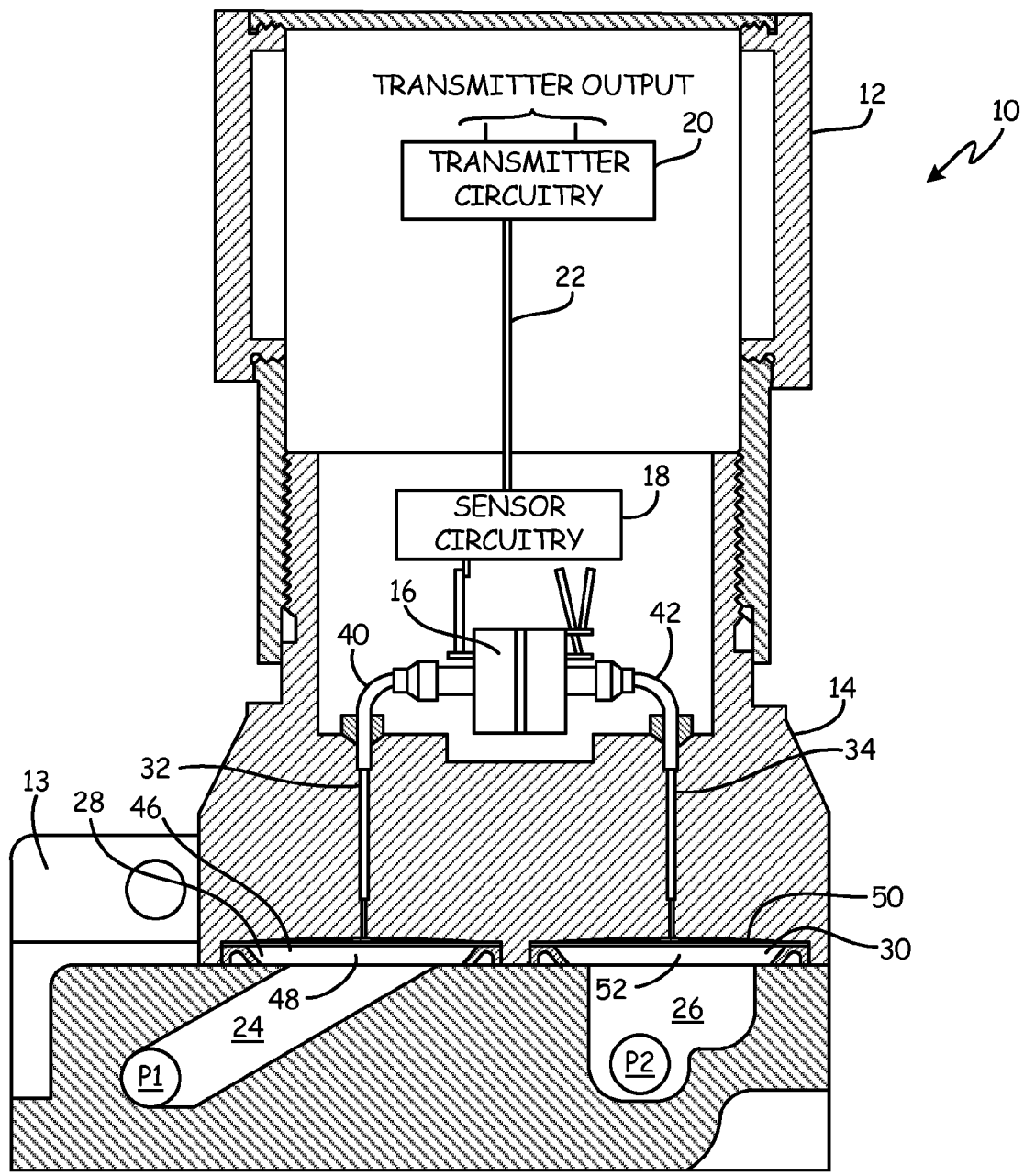
FIG. 1 is a diagrammatic view of a process fluid differential pressure transmitter with which embodiments of the present invention are particularly useful.

FIG. 1 shows an exemplary process fluid pressure transmitter 10 with which embodiments of the present invention are particularly useful. Transmitter 10 includes transmitter body 12, coupling flange or manifold 13 and sensor body 14. Although embodiments of the present invention will be described with respect to a coplanar flange, embodiments of the present invention may be practiced on any kind of flange, manifold, or other coupling adapter that receives a process fluid.

Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of the process fluid over a process communication link such as a two wire process control loop (or circuit).

In some circumstances, pressure sensor 16 can measure a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as silicone oil.

Passageway 24 is positioned adjacent opening 28 in sensor body 14 and passageway 26 is positioned adjacent opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent passageway 26. Passageway 34 extends through coupling 38 and sensor body 14 to diaphragm 50.

In operation, flange 13 presses against seals 48 and 52 when transmitter 10 is bolted to flange 13. Seal 48 is seated on sensor body 14 adjacent to opening 24 and diaphragm 46, and prevents process fluid leakage from passageway 24 and opening 28 past flange 13 to the outside environment. Similarly, seal 52 is coupled to sensor body 14 adjacent to opening 26 and diaphragm 50, and prevents process fluid leakage from passageway 26 and opening 30 past flange 13 to the outside environment.

Figure 2:
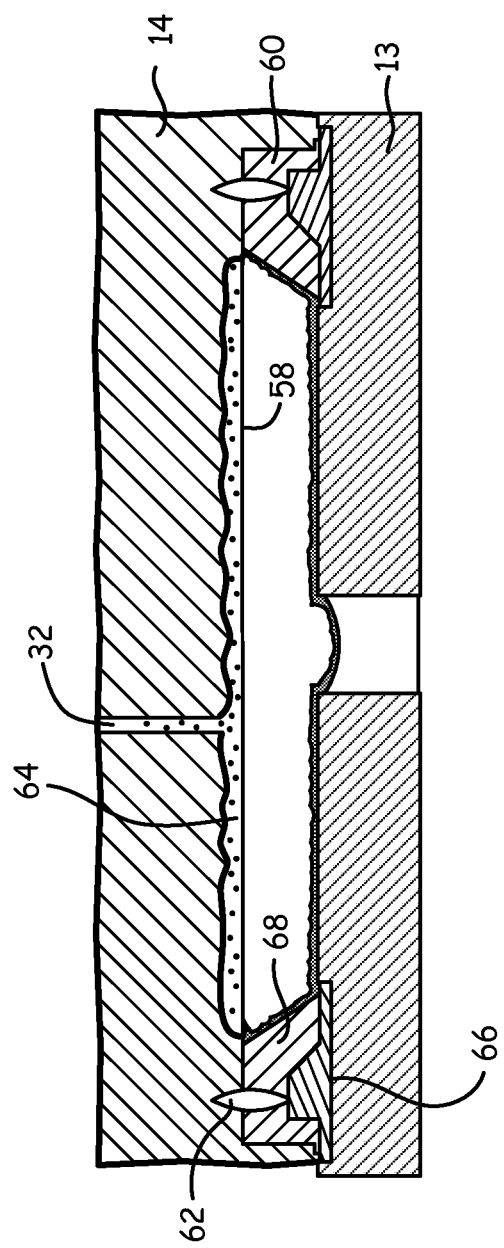
FIG. 2 is a diagrammatic view of a non-metallic seal used in conjunction with a known process isolation diaphragm assembly.

FIG. 2 is a diagrammatic view of a non-metallic seal used in conjunction with a known process isolation diaphragm assembly. Isolation diaphragm 58 is welded about its periphery to weld ring 60. Weld ring 60 is then welded to sensor body 14 via module weld 62. Once weld ring 60 is welded to sensor body 14, the fill fluid may be introduced into the system which passes through passageway 32 and fills chamber 64. Accordingly, as process fluid acts on isolation diaphragm 58, the movement of isolation diaphragm 58 generates fill fluid movement in passageway 32 which movement conveys pressure to differential pressure sensor 16. When the pressure transmitter is to be mounted to flange 13, a seal, such as non-metallic seal 66 is used, which engages groove 68 of weld ring 60. Non-metallic seals work very well for applications with low to moderate process fluid pressures, as well as applications at low to moderate process fluid temperatures. As shown in FIG. 2, process isolation diaphragm 58 is attached to sensor body 14 by welding through a secondary support piece (weld ring 60) with diaphragm 58 sandwiched therebetween. The weld is located at the bottom of groove 68 that is also used for seating non-metallic seal 66. Non-metallic seal 66 is able to seal over the surface of module weld 62, but it is limited to being able to seal to about 6000 psi and its sealing ability decreases with extreme hot and/or cold temperature exposure.

Metallic seals have very specific requirements relative to the surfaces upon which they may seat against. The exposed surface of a weld that has gone through a weld-ring does not meet such surface requirements.

Figure 3:
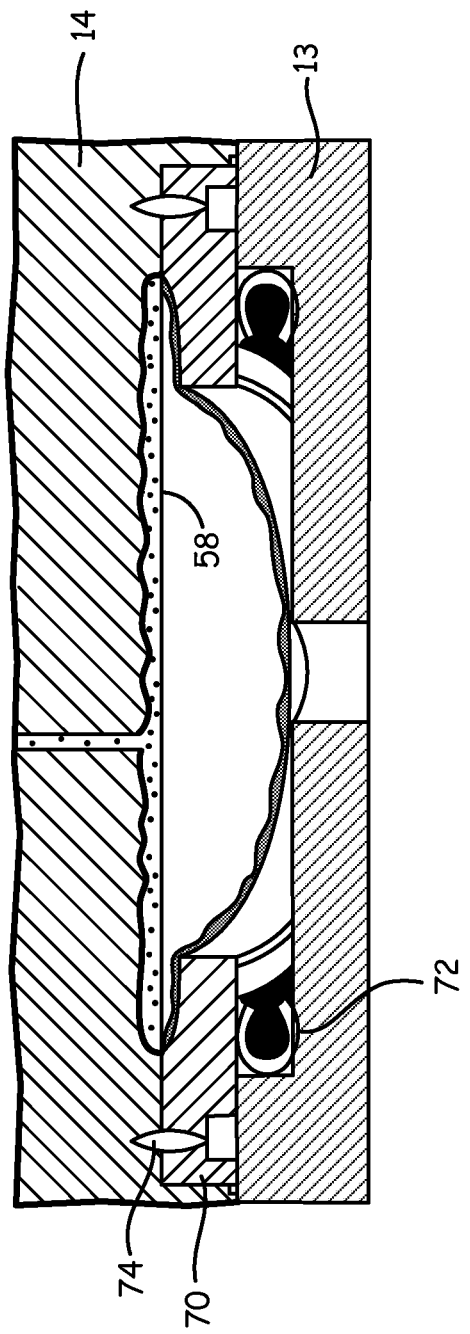
FIG. 3 is a diagrammatic view of a process isolation diaphragm assembly utilizing a metal seal.

One way to overcome this surface requirement is to move the sealing surface from directly above or adjacent the weld to an offset distance, such as shown in FIG. 3. FIG. 3 illustrates a metallic seal (C-ring 72) coupling between flange 13 and weld ring 70. The weld between weld ring 70 and sensor body 14 is shown offset from metal seal 72. While the configuration shown in FIG. 3 ensures that the surface requirements for metal seal 72 can be achieved, it is apparent that the metal seal is acting against a portion of weld ring 70 that imparts a moment or torque within weld ring 70. Accordingly, the design shown in FIG. 3 may be susceptible to problems that reduce its fatigue life for process pressures above 6000 psi. Additionally, the radial offset between metal seal 72 and module weld 74 can make the assembly sensitive to pre-load induced by metal seal 72, which can negatively affect transmitter performance.

Figure 4:
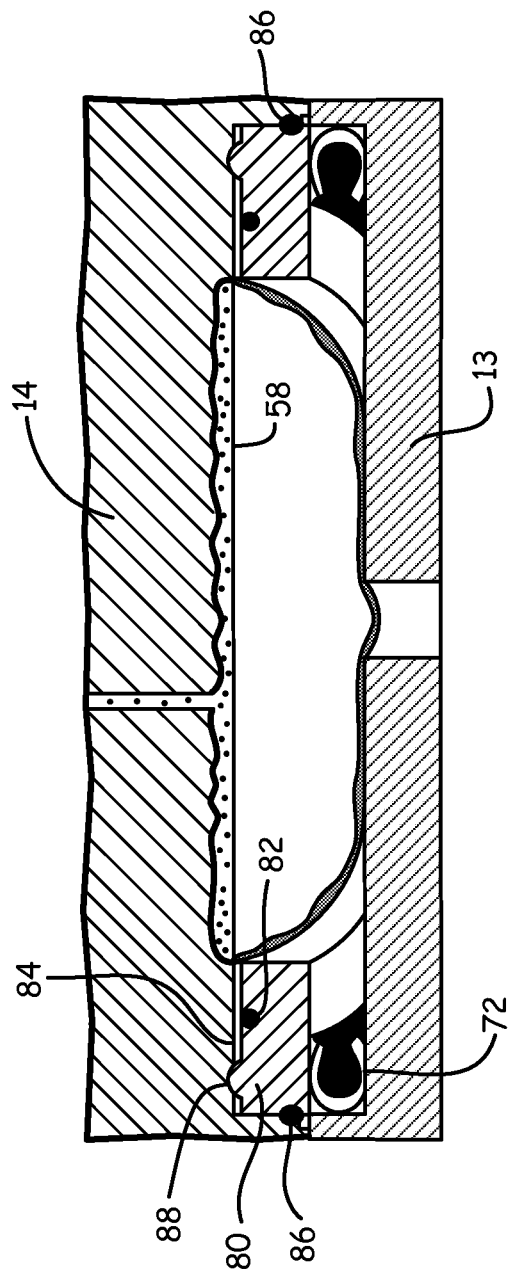
FIG. 4 is a diagrammatic view of a process isolation diaphragm assembly utilizing a metal seal in accordance with an embodiment of the present invention.

FIG. 4 is a diagrammatic cross sectional view of a process isolating diaphragm assembly for a metal process seal in accordance with an embodiment of the present invention. Isolation diaphragm 58 is welded to weld ring 80 at weld 82. Additionally, diaphragm spacer 84 is set or mounted on the opposite side of diaphragm 58 from weld 82. Spacer 84 functions to allow for a more reliable weld of isolation diaphragm 58 to weld ring 80. As shown in FIG. 4, seal 72 does not seat in any groove of weld ring 80. Instead, weld ring 80 is substantially a solid rectangle in cross-section. Moreover, the portion of weld ring 80 upon which metal seal 72 bears can have a carefully controlled surface to ensure that the surface requirements of metal seal 72 are achieved. Metal seal 72 can be any suitable metal seal formed of any suitable metal or alloy. However, in some embodiments, metal seal 72 is a self-energizing metal seal, such as a C-ring. With such seals, as the process fluid pressure increases, the sealing ability of seal 72 increases accordingly.

Once isolation diaphragm 58 is attached to weld ring 80, and diaphragm spacer 84 is attached on top of diaphragm 58, the assembly is welded to sensor body 14 at projection weld 88. Projection weld 88 projects from weld ring 80 into sensor body 14. In accordance with embodiments of the present invention, projection weld 88, or any other suitable structure of weld ring 80 that bears against sensor body 14 preferably does so in alignment with metal seal 72. Thus, the force transmitted through metal seal 72 is conveyed in a substantially straight line through weld ring 80 and projection weld 88. In this way, no moment or torque is created with process fluid pressure. Accordingly, the structure shown in FIG. 4 is believed to be less susceptible to fatigue-based issues.

Isolation diaphragm 58 is typically welded to weld ring 80 as a subassembly operation. This can be done by a laser weld, in accordance with known techniques. The subassembly weld is only for attaching the diaphragm 58 to weld ring 80 and does not directly affect the metal seal. The subassembly (weld-ring and diaphragm) is then welded to the sensor body 14 via projection weld 88. The projection weld is located in direct alignment with the seating surface of metal seal 72, with a projection feature machined into weld ring 80. This is possible because the process of performing the projection weld does not affect the surface finish of the weld ring that metal seal 72 seats against. By having the metal seal 72 seated in direct alignment with projection weld 88, a more equal balance of pressurized areas on weld ring 80 is achieved, resulting in increased fatigue life when subjected to process fluid pressures above 6000 psi. Additionally, by eliminating the groove that is typically used for standard welding practices, the weld ring is actually more rigid and if necessary can employ a structurally supporting secondary weld 86 that further increases high pressure fatigue life. Another benefit of the embodiment illustrated with respect to FIG. 4 is that the direct loading of the weld ring projection weld 88 keeps a consistent hinge point of the process isolating diaphragm assembly, even under high process pressures and high flange loads. Secondary support weld 86 can be located adjacent the periphery of weld ring 80 to couple weld ring 80 to sensor body 14 at a second location. Adding secondary support weld 86 provides further improvement and consistency of the hinge point of isolation diaphragm 58. Alternative metal seals that include greater sealing load can also be used without affecting the diaphragm hinge point and they do not negatively affect transmitter performance.

Figure 5:
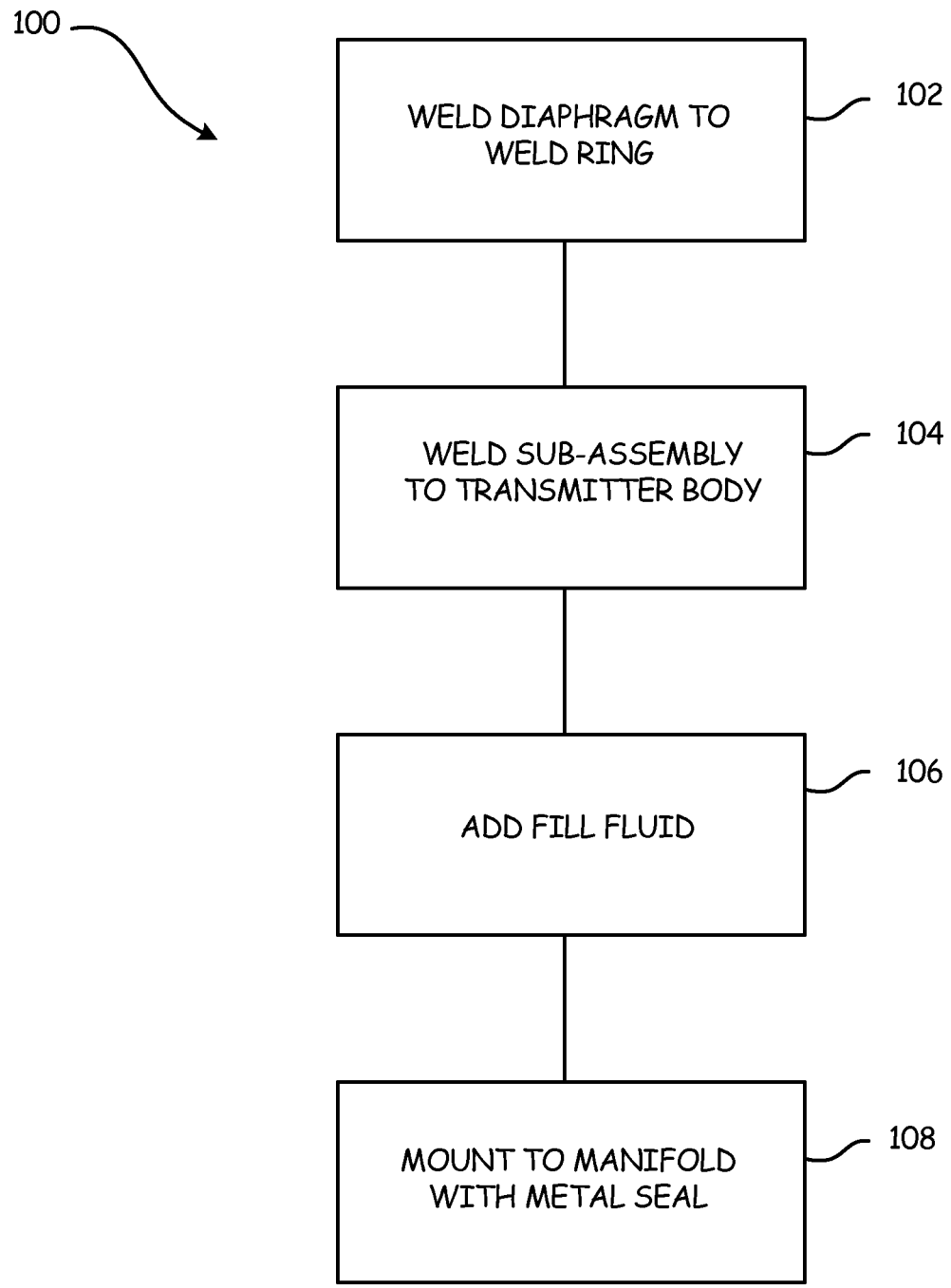
FIG. 5 is a flow diagram of a method of assembling a process fluid pressure transmitter assembly in accordance with an embodiment of the present invention.

FIG. 5 is a flow diagram of a method of assembling a process fluid pressure transmitter assembly in accordance with an embodiment of the present invention. Method 100 begins at block 102 where an isolation diaphragm is welded to a weld ring as a sub-assembly operation. This weld can be performed is accordance with any suitable techniques including a laser weld. Next, at block 104, the sub-assembly is welded to a sensor body of a process fluid pressure transmitter using a projection weld. The location of the projection weld is selected to be aligned with a portion of the weld ring that will bear against a metallic seal. Note, blocks 102 and 104 will be performed for each isolation subassembly of the process fluid pressure transmitter. Thus, if the process fluid pressure transmitter is a differential process fluid pressure transmitter, then blocks 102 and 104 will be performed twice.

Once the isolation subassembly or subassemblies are welded to the sensor body, the fill fluid can be added as indicated at block 106. When the process fluid pressure transmitter is to be mounted to a process, a flange or manifold is used to couple the process to the transmitter. At block 108, the process fluid pressure transmitter is mounted to a manifold using a metal seal that is substantially aligned with the projection weld.

Although the present invention has been described with reference to preferred embodiments, workers skilled in the art will recognize that changes may be made in form and detail without departing from the spirit and scope of the invention.

What is claimed is:
1. A process fluid pressure transmitter comprising:
   a sensor body including:
      a pressure sensor; and electronics coupled to the pressure sensor and configured to obtain an indication of pressure from the pressure sensor; and at least one process fluid isolation assembly fluidically coupled to the pressure sensor and configured to receive a process fluid, the at least one process fluid isolation assembly including an isolation diaphragm welded to a weld ring, the weld ring having a sealing surface on a first side adapted for contact with a metal sealing ring and a weld portion welded to the sensor body on a second side, wherein at least a portion of the weld portion is disposed directly over the sealing surface, such that the sealing surface and the weld portion are substantially aligned with one another.

2. The process fluid pressure transmitter of claim 1, wherein the weld portion is a projection weld portion welded to the sensor body.

3. The process fluid pressure transmitter of claim 2, wherein the at least one process fluid isolation assembly includes a plurality of process fluid isolation assemblies, each being assembly being fluidically coupled to the pressure sensor, such that the pressure sensor provides an indication of differential pressure.

4. The process fluid pressure transmitter of claim 2, and further comprising a spacer interposed between the isolation diaphragm and the sensor body.

5. The process fluid pressure transmitter of claim 2, and further comprising a support weld coupling the weld ring to the sensor body.

6. The process fluid pressure transmitter of claim 5, wherein the support weld is disposed adjacent a periphery of the weld ring.

7. The process fluid pressure transmitter of claim 2, and further comprising a manifold coupled to the at least one process fluid isolation assembly, the manifold being sealed to the isolation assembly with a metal seal.

8. The process fluid pressure transmitter of claim 7, wherein the metal seal is a self-energizing seal.

9. The process fluid pressure transmitter of claim 8, wherein the self-energizing seal is a c-ring.

10. The process fluid pressure transmitter of claim 7, wherein the metal seal is substantially aligned with the sealing surface and the projection weld.

11. The process fluid pressure transmitter of claim 2, wherein the weld ring is substantially rectangular in cross section.

12. The process fluid pressure transmitter of claim 2, wherein the isolation diaphragm is fluidically coupled to the pressure sensor by a substantially incompressible liquid.

13. The process fluid pressure transmitter of claim 2, and wherein the electronics comprises sensor circuitry coupled to the pressure sensor and transmitter circuitry coupled to the sensor circuitry and configured to convey process fluid pressure information to another device over a process communication link.

14. An isolation diaphragm subassembly for a process fluid pressure transmitter, the subassembly comprising:

a circular weld ring having a first side and a second side, the first side having a sealing portion adapted to contact a metal sealing ring and the second side having a weld portion being configured to be welded to a sensor body;

an isolation diaphragm welded to the second side of the weld ring; and wherein at least a portion of the weld portion is disposed directly over the sealing portion, such that the sealing portion and the weld portion are substantially aligned with each other.

15. The isolation diaphragm subassembly of claim 14, wherein the weld portion is a projection weld portion that is configured to be projection welded to the sensor body.

16. The isolation diaphragm assembly of claim 15, and further comprising a spacer disposed proximate the diaphragm and a portion of the second side that is configured to be projection welded to the sensor body.

17. The isolation diaphragm assembly of claim 15, wherein the circular weld ring is substantially rectangular in cross section.

18. A method of forming a process fluid pressure transmitter assembly, the method comprising:

providing at least one weld ring having a weldable surface and a sealing surface, opposite the weldable surface, the sealing surface being configured to engage a metal sealing ring;

welding an isolation diaphragm to the weld ring;

welding the weldable surface to a sensor body of a process fluid pressure transmitter; and coupling the process fluid pressure transmitter to a manifold using a metallic seal disposed between the sealing surface and the manifold, such that the sealing surface, metallic seal and weldable surface are substantially aligned with each other.

19. The method of claim 18, wherein the weldable surface is a projection weldable surface.

20. The method of claim 19, and further comprising interposing a spacer between the isolation diaphragm and the sensor body proximate the projection weldable surface.

21. The method of claim 19, and further comprising providing a secondary weld between the weld ring and the sensor body.

* * * * *

UNITED STATES PATENT AND TRADEMARK OFFICE
CERTIFICATE OF CORRECTION

PATENT NO. : 9,513,183 B2  
APPLICATION NO. : 14/319400  
DATED : December 6, 2016  
INVENTOR(S) : Tyler Matthew Thompson, David Anthony Horky and Thomas Earl Johnson It is certified that error appears in the above-identified patent and that said Letters Patent is hereby corrected as shown below:

In the Claims

Column 5 Line 21, Claim 3, the first "being" should be removed.

Column 5 Line 35, Claim 7, "scaled" should be "sealed".

Signed and Sealed this
Twenty-seventh Day of March, 2018

Andrei Iancu
*Director of the United States Patent and Trademark Office*